(12) United States Patent
Xun et al.

(10) Patent No.: US 9,044,658 B2
(45) Date of Patent: Jun. 2, 2015

(54) I-BEAM CONSTRUCTION IN A HOCKEY BLADE CORE

(71) Applicant: Warrior Sports, Inc., Warren, MI (US)

(72) Inventors: Sean Xun, San Diego, CA (US); Carlos Raul Gutierrez Bautista, Tijuana (MX); Edmundo Gerardo Llamas, Tijuana (MX)

(73) Assignee: Warrior Sports, Inc., Warren, MI (US)

( * ) Notice: Subject to any disclaimer, the term of this patent is extended or adjusted under 35 U.S.C. 154(b) by 256 days.

(21) Appl. No.: 13/661,968

(22) Filed: Oct. 26, 2012

(65) Prior Publication Data

US 2013/0116070 A1  May 9, 2013

Related U.S. Application Data

(60) Provisional application No. 61/555,662, filed on Nov. 4, 2011.

(51) Int. Cl.
| A63B 59/14 | (2006.01) |
| A63B 59/00 | (2006.01) |
| B29C 70/86 | (2006.01) |
| B29L 31/52 | (2006.01) |

(52) U.S. Cl.
CPC .......... *A63B 59/14* (2013.01); *A63B 59/0088* (2013.01); *A63B 2209/02* (2013.01); *B29L 2031/52* (2013.01); *B29C 70/865* (2013.01)

(58) Field of Classification Search
USPC .................... 473/560–563, 519–520
See application file for complete search history.

(56) References Cited

U.S. PATENT DOCUMENTS

| 3,563,546 A | 2/1971 | Dawe |
| 3,934,875 A | 1/1976 | Easton et al. |
| 4,013,288 A | 3/1977 | Goverde |
| 4,124,208 A | 11/1978 | Burns |
| 4,570,932 A | 2/1986 | Cote |
| 5,407,195 A | 4/1995 | Tiitola et al. |
| 5,676,608 A | 10/1997 | Christian et al. |
| 5,685,792 A | 11/1997 | Ruoff |
| 6,626,775 B2 | 9/2003 | Tiitola |
| 7,044,870 B2 | 5/2006 | Pagotto |
| 7,476,167 B2 | 1/2009 | Garcia |

(Continued)

FOREIGN PATENT DOCUMENTS

| WO | WO 99/17846 | 4/1999 | |
| WO | WO 03/097181 | * 5/2003 | ............. A63B 59/14 |

*Primary Examiner* — Gene Kim
*Assistant Examiner* — M Chambers
(74) *Attorney, Agent, or Firm* — Warner Norcross & Judd LLP

(57) ABSTRACT

A reinforced hockey stick blade and a related method of manufacture are provided. The hockey stick blade can include a core element defining one or more longitudinal channels bounded by an upper core portion, a lower core portion, and a bridge portion interconnecting the upper and lower core portions. The hockey stick blade can additionally include a plurality of fiber-reinforced plies substantially encapsulating the core element and a reinforcing material received within the one or more longitudinal channels. The reinforcing material can extend longitudinally from a first channel end portion to a second channel end portion, and can include woven or unidirectional fiber-reinforced plies. The reinforcing material can additionally extend transversely across the channel to form a blade structure having increased blade strength and durability over existing composite hockey stick blades.

14 Claims, 11 Drawing Sheets

(56) References Cited

U.S. PATENT DOCUMENTS

| | | |
|---|---|---|
| 7,824,591 B2 | 11/2010 | Gans |
| 7,914,403 B2 | 3/2011 | Ie |
| 8,602,923 B2 | 12/2013 | Jeanneau |
| 2002/0037780 A1 | 3/2002 | York et al. |
| 2005/0070382 A1 | 3/2005 | Loschiavo |
| 2005/0181897 A1* | 8/2005 | Chen et al. .................... 473/563 |
| 2006/0240918 A1* | 10/2006 | Montecchia .................. 473/560 |
| 2011/0237365 A1 | 9/2011 | McGrath et al. |
| 2013/0116070 A1* | 5/2013 | Xun et al. ..................... 473/561 |
| 2013/0172135 A1* | 7/2013 | Jeanneau ...................... 473/561 |
| 2014/0057746 A1 | 2/2014 | Jeanneau |

* cited by examiner

I-BEAM CONSTRUCTION IN A HOCKEY BLADE CORE

BACKGROUND OF THE INVENTION

The present invention relates to a composite hockey stick blade and a related method of manufacture.

There are a variety of commercially available hockey blade constructions. The internal configuration of these hockey blades may be altered depending on the characteristics desired by a player, including the feel, curve, flex and strength. In some cases, the characteristics desired by a player depend on the position of the player. For example, a defensive player may desire a certain blade configuration, while an offensive player may desire a different blade configuration. In some configurations, adjusting the blade characteristics may require a complete redesign of numerous elements of the blade. This results in added expense for stick manufacturers to provide different models of blades with different characteristics.

Some modern hockey manufacturers have moved from more traditional wood blades to a blade made partially of foam. Foam constructions provide the blade with a low-weight construction. However, the foam constructions can be less durable, weak and can provide insufficient strength for achieving high velocities when striking a puck. Current constructions to strengthen the foam may add significant thickness to the blade, which may make the blade clumsy for the fine movements and puck handling required of players. Further, some foam configurations include separate pieces of foam in the blade. These configurations can be undesirable due to added processing, material handling, and assembly costs in creating and working with the separate foam pieces.

SUMMARY OF THE INVENTION

A composite hockey stick blade and a related method of manufacture provide a reinforced core element with increased blade strength and durability.

In one embodiment, a composite hockey stick blade is provided. The composite hockey stick blade includes a core element defining a channel bounded by an upper core portion, a lower core portion and one or more bridge portions. The hockey stick blade can additionally include multiple fiber-reinforced plies substantially encapsulating the core element and a reinforcing material received within the channel. The reinforcing material can extend longitudinally from a first channel end portion to a second channel end portion, and can extend transversely across the channel to interconnect fiber-reinforced plies on opposing sides of the core element.

In another embodiment, the core element defines an upper channel and a lower channel. The upper and lower channels are spaced apart from each other, with a core element therebetween, and extend from the heel of the hockey stick blade toward the toe of the hockey stick blade. The core element optionally is a unitary structural foam core.

In yet another embodiment, the reinforcing material includes a plurality of fiber-reinforced plies. The fiber-reinforced plies can be co-curable with the plies substantially encapsulating the core element, and can include graphite, aramid, and/or fiberglass fibers. The fibers can be unidirectional or woven, optionally being pre-impregnated with an epoxy resin prior to lay-up of the blade preform.

In still another embodiment, the reinforcing material within the channel can be in the form of a tubular element. The tubular element can be disposed substantially entirely within the channel. Optionally, the outer surfaces of the tubular element can generally lay within an outer plane within which the front and/or rear surfaces of the core element are disposed.

In even another embodiment, a method for manufacturing a reinforced hockey stick blade is provided. The method includes defining a channel in a foam core, inserting a reinforcing material in the channel, and laying up one or more outer plies over the foam core to achieve a blade preform. The reinforcing material can extend longitudinally from a first channel end portion to a second channel end portion, and can extend transversely across the channel to interconnect one or more outer plies on opposing sides of the foam core. The blade preform can be cured within a mold cavity having the exterior shape of the finished blade to form a composite hockey stick blade having improved strength and durability.

In a further embodiment, the above method includes forming a foam core including an upper core portion, an intermediate core portion, a lower core portion, and a bridge portion integral with the upper, intermediate and lower core portions. The foam core can define an upper channel between the upper and intermediate core portions, and a lower channel between the intermediate and lower core portions. The upper and lower channels can be substantially parallel to each other, being spaced apart by the intermediate core portion.

In yet a further embodiment, the above method includes inserting a plurality of fiber-reinforced strips within the upper and lower channels. The plurality of fiber-reinforced strips can be coextensive in length with the respective channel, including a width at least as wide as the width of the foam core. The plurality of fiber-reinforced strips can be pre-impregnated with an epoxy resin, and can include sections of woven or unidirectional fiber-reinforced tape.

The embodiments herein can maintain the light weight of a composite blade, while providing reinforcement for the foam core. As a result, the blade can be manufactured with a greater maximum breaking force without adding significant thickness to the blade. Where desired, the composite blade can be modified to achieve tailored performance characteristics, including modifications to the core element, the reinforcing material, the outer skin plies, and the addition of internal adhesive films.

These and other objects, advantages, and features of the invention will be more fully understood and appreciated by reference to the description of the current embodiments and the drawings.

Before embodiments of the invention are explained in detail, it is to be understood that the invention is not limited to the details of operation or to the details of construction and the arrangement of the components set forth in the following description or illustrated in the drawings. The invention may be implemented in various other embodiments and may be practiced or carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DESCRIPTION OF THE CURRENT EMBODIMENTS

I. Overview

The current embodiments relate to a composite hockey stick blade and a method for forming the same. The composite hockey stick blade and method provide a reinforced core element with increased blade strength and durability. Embodiments can be used in connection with ice hockey sticks, goalie sticks, hockey sticks adapted for non-slip surfaces, and hockey sticks whose size and dimensions vary from that of the hockey sticks described below.

Figure 1:
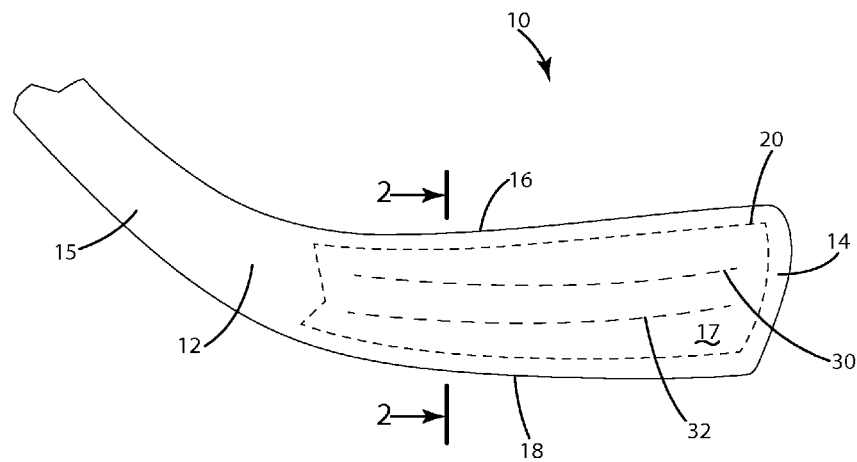
FIG. 1 is a front view of a composite hockey stick blade in accordance with an embodiment of the invention.

A composite hockey stick blade in accordance with a current embodiment is shown in FIG. 1 and generally designated 10. The blade 10 includes a heel portion 12 and a toe portion 14 defining a length therebetween. As used herein, the heel portion 12 can generally include the lowermost region of the blade 10 adjacent a hosel 15, including at least a portion of the upwardly curved transition to the hosel 15. The blade 10 additionally includes a top edge 16 and a bottom edge 18 for defining a height, and a front face 17 opposite a back face 19 for defining a width.

The blade 10 includes a core element 20 positioned within the interior of the blade 10, generally extending from the heel portion 12 to the toe portion 14. The core element 20 can include a foam material selected to have a desired density and rigidity. Suitable foam materials include Divinycell® HP130 structural foam available from DIAB Group AB, or AIREX® C71 structural foam available from 3A Composite Core Technologies. Other foam or non-foam materials can be used in other embodiments. Though shown as a unitary structure, the core element 20 can include multiple adjoining or interlocking segments having the same or different properties.

As noted above, the core element 20, referred to herein as a foam core 20, is reinforced to provide added strength to the blade 10. In particular, the foam core 20 includes one or more longitudinal channels 30, 32 for receipt of a fiber-reinforced material therein. The fiber-reinforced material can include a prepreg, optionally the same prepreg used in the lay-up for the hockey stick blade 10. As set forth in greater detail below, the one or more strips of the fiber-reinforced material can be inserted transversely through the channels 30, 32 to reinforce the foam core 20 without materially adding to the thickness of the blade 10.

The blade 10 shown in FIG. 1 includes the foam core 20 and channels 30, 32 shown in phantom. It should be noted that the foam core 20 and channels 30, 32 in FIG. 1 are depicted for illustrative purposes. The foam core 20 and channels 30, 32 would likely be concealed by the other elements of the blade 10, if the other elements of the blade 10 are opaque. Illustrative configurations are also shown in connection with other embodiments shown in FIGS. 7, 9, 11, 13, 17 and 19.

II. Construction

A blade 10 including a reinforced foam core 20 in accordance with a current embodiment will now be described in more detail with reference to FIGS. 2-4. The reinforced foam core 20 may include a first core face 22, a second core face 24, a top core edge 26, a bottom core edge 28, a toe core edge 27 and a heel core edge 29. One or more channels 30, 32 may be defined in the foam core 20 at a location between the top core edge 26 and the bottom core edge 28, and between the toe core edge 27 and the heel core edge 29.

Each channel may have a first channel end 36, 38 proximate the toe region 14 and a second channel end, 40, 42 proximate the heel region 12. Optionally, more or less than the illustrated two channels may be defined in foam core 20. The channels 30, 32 may extend from the first core face 22 to the second core face 24 to form a hole through the foam core 20. The channels 30, 32 may be bounded by an upper core portion 50, a lower core portion 52 and a middle core portion 54. The channels 30, 32 may be a variety of heights (taken between upper core portion 50 and middle core portion 54, and between middle core portion 54 and lower core portion 52). For example, the channels 30, 32 may be between 0.02 and 0.1 inches high, optionally between 0.04 and 0.08 inches high, and further optionally 0.0625 inches high. The channels 30, 32 may be in a variety of configurations, including substantially horizontal, angled, curved and substantially vertical. Further, the channels 30, 32 may be in a variety of configurations in relation to one another, including substantially parallel and substantially non-parallel. The configuration of the channels may be selected based on the desired characteristics of the blade 10.

Figure 3:
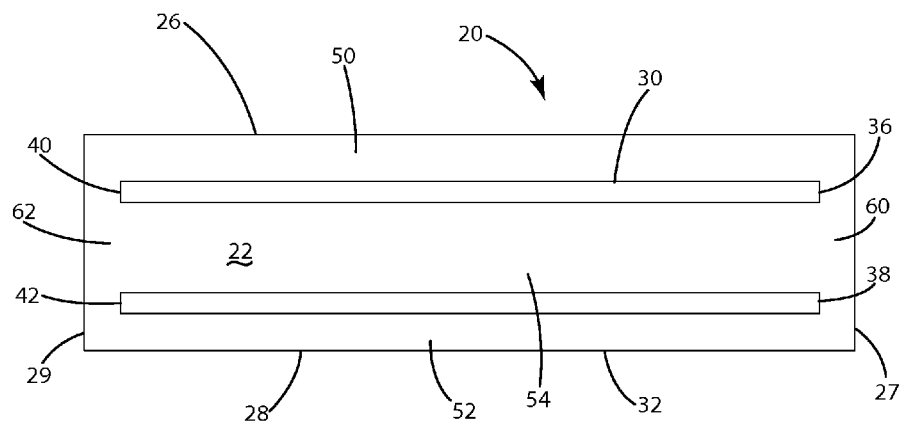
FIG. 3 is a front view of a core element of the composite hockey stick blade of FIG. 1 illustrating upper and lower channels.
Figure 4:
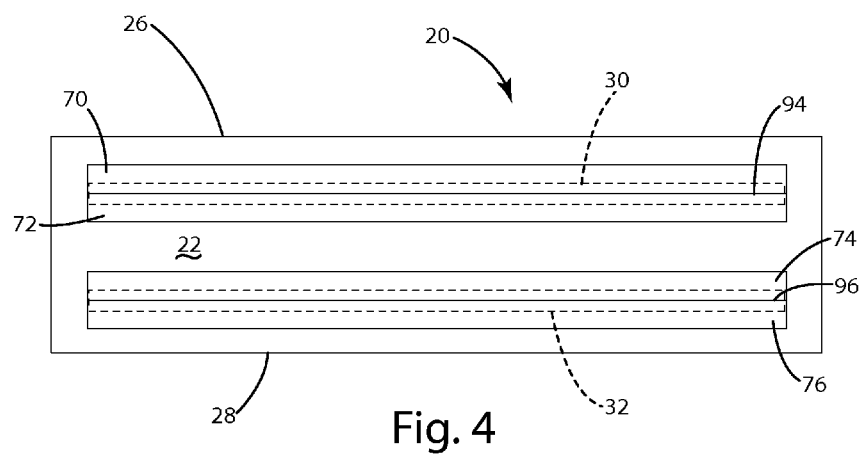
FIG. 4 is a front view of the core element of FIG. 3 including reinforcing material received within the upper and lower channels.

As also shown in FIG. 3, the upper core portion 50, the middle core portion 54 and the lower core portion 52 may be attached to and continuous with one another via a first foam core bridge member 60, optionally in the toe region 14, and/or a second foam core bridge member 62, optionally in the heel region. The bridge members 60, 62 and the remainder of the foam core 20 may form a unitary, one-piece, monolithic structure, with the bridge members 60, 62 closing the first ends 36, 38 and second ends 40, 42 of the channels 30, 32. It is also contemplated that only one bridge member 60, 62 may be used. In this configuration, the end of the channels 30, 32 without a bridge member 60, 62 may be left open and may not be closed. Optionally, in this configuration, the end of the channels 30, 32 without a bridge member 60, 62 may be closed by other elements, including one or more skin ply layers 100, 102, 104, 106, which will be further described below.

As noted above, the channels 30, 32 can receive a fiber-reinforced material therein. The fiber-reinforced material can include any material adapted to strengthen the foam core 20. For example, the fiber-reinforced material can include woven or unidirectional graphite fiber prepreg, fiberglass fiber prepreg, aramid fiber prepreg, blend fiber prepreg, as well as any of the above plies not yet impregnated with a resin. Still other materials can be used in other embodiments where desired.

Figure 2:
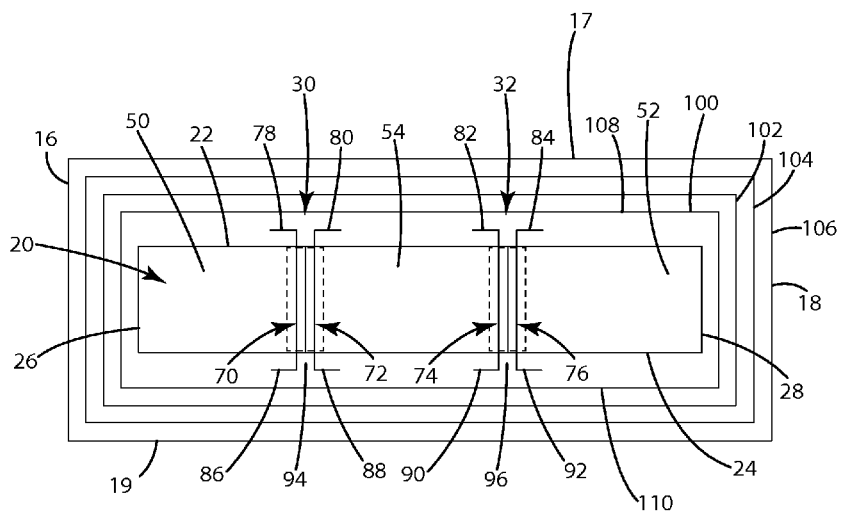
FIG. 2 is a sectional view taken along line 2-2 of FIG. 1.

Referring now to FIG. 2, one or more strips of fiber-reinforced material 70, 72, 74, 76 may be inserted transversely through the channels 30, 32 so that a first strip end 78, 80, 82, 84 may project from the foam core 20 adjacent the first core face 22, and so that a second strip end 86, 88, 90, 92 may project from the foam core 20 adjacent the second core face 24. The first strip ends 78, 80, 82, 84 and second strip ends 86, 88, 90, 92 may be folded over, so they are positioned adjacent the first core face 22 and second core face 24. Additional strips may overlap and layer on top of the strips 70, 72, 74, 76. Optionally, the same number of layered strips may be positioned adjacent the first core face 22 and the second core face 24 to form a relatively flat area for the at least one skin ply layer 100, 102, 104, 106 to bond to, as further described below. For example, the embodiment illustrated in FIG. 2 includes a single layer of strips positioned adjacent the first core face 22 and the second core face 24. If a second strip is added over the top of each of the illustrated strips 70, 72, 74, 76, a "double" layer of strips would be positioned adjacent the first core face 22 and the second core face 24, forming a relatively flat area adjacent each of the first core face 22 and second core face 24. Additional supplemental strips of fiber reinforced material 94, 96 may be inserted transversely through the channels 30, 32 so that the additional strips 94, 96 may be positioned substantially completely within the channel 30, 32.

The reinforcing strips 70, 72, 74, 76 and the supplemental strips 94, 96 may be made of any suitable material, including woven fabrics material preimpregnated with resin (prepreg material) and unidirectional tape material preimpregnated with resin. The fibers in the prepreg material may be any suitable fibers including carbon fibers, graphite fibers, aramid fibers and fiberglass fibers, for example. The total thickness of the reinforcing strips 70, 72, 74, 76 and the supplemental strips 94, 96 may be any total thickness suitable for placement through the channels 30, 32. For example, the total thickness of the strips and supplemental strips may be between 0.005 and 0.4 inches, optionally between 0.007 and 0.3 inches, and further optionally between 0.01 and 0.2 inches. The total thickness may be altered depending on the desired characteristics of the blade 10.

The reinforcing strips 70, 72, 74, 76 and the supplemental strips 94, 96 may span the entire length of the channels 30, 32 (between bridge members 60, 62), or may span a length less than the entire length of the channels 30, 32. Optionally, the reinforcing strips 70, 72, 74, 76 and the supplemental strips 94, 96 may be combined with other strips to span the entire length of the channels, 30, 32. Further optionally, a predetermined number of strips may be placed at a predetermined spacing from one another to provide the blade with desired characteristics. In a further optional configuration, only supplemental strips 94, 96 may be used such that all strips in the configuration are positioned substantially completely within the channel 30, 32. Even further optionally, in this configuration, it is contemplated that all of the supplemental strips may not bond to the at least one skin ply layer 100, 102, 104, 106.

As also shown in FIG. 2, one or more skin ply layers 100, 102, 104, 106 may be wrapped around the foam core 20. The one or more skin ply layers 100, 102, 104, 106 may extend continuously along the first core face 22, top core edge 26, second core face 24 and bottom core edge 28. The one or more skin ply layers 100, 102, 104, 106 may also be arranged in separate sections, with each section oriented on one or more of the first core face 22, top core edge 26, second core face 24 and bottom core edge 28. If more than one skin ply layer is used, the skin ply layers may be configured as concentric wrappings (as illustrated in FIG. 2), or as one continuous spiral wrapping that forms multiple layers. The at least one skin ply layer 100, 102, 104, 106 may contact the first strip ends 78, 80, 82, 84 adjacent the first core face 22 and may contact the second strip ends 86, 88, 90, 92 adjacent the second core face 24. The skin ply layers 100, 102, 104, 106 may be made of prepreg material. The fibers in the prepreg material may be any suitable fibers including unidirectional and woven carbon fibers, optionally the same prepreg material received in the channels 30, 32.

During molding (described below), the reinforcing strips 70, 72, 74, 76, and the supplemental strips 94, 96 are cured, creating a strong "I-beam" configuration as shown in FIG. 2 (see reinforcing strips 70, 72 and supplemental strip 94 create an "I" and reinforcing strips 74, 76 and supplemental strip 96 create an "I"). The I-beams may form a bridge between a first face 108 and a second face 110 of the at least one skin ply layer 100, 102, 104, 106. The bridge may provide added strength to the foam core 20 and increase the strength of the overall blade 10.

III. Method of Manufacture

Figure 5:
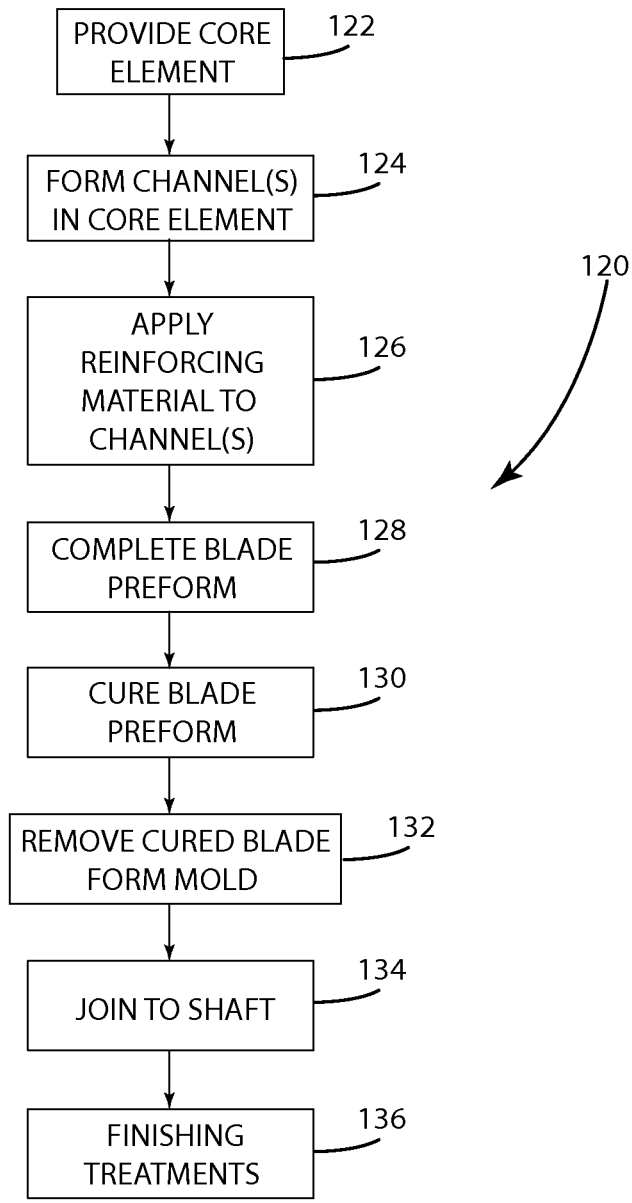
FIG. 5 is a flow chart for a method for forming the composite hockey stick blade of FIGS. 1-4.

Referring now to FIG. 5, a method for forming the reinforced hockey stick blade 10 is illustrated and generally designated 120. The method generally includes providing a core element 20 at step 122. According to one embodiment, core element includes structural foam. For example, the core element can include AIREX® C71 structural foam from 3A Composites International AG, or Divinycell® HP130 structural foam from DIAB Group AM. The energy-absorbing core material can include non-foam materials in other embodiments as desired. At step 124, one or more channels 30, 32 are formed in the core element 20. The channels can be formed by punching, cutting, or any other suitable foam forming method. One or more foam core bridges 60, 62 may be preserved at the sides of the foam core 20 to connect the portions of the foam core 20 defined by the one or more channels 30, 32. For example, the one or more foam core bridges 60, 62 may connect the upper core portion 50, the middle core portion 54 and the lower core portion 52. In addition, the channels 30, 32 can extend generally parallel to each other, extending longitudinally from the toe region to the heel region. Other configurations are as possible, including configurations set forth below in connection with FIGS. 7-20.

At step 126, one or more reinforcing strips 70, 72, 74, 76 may be provided and inserted transversely through the one or more channels 30, 32. For example, the first strip ends 78, 80, 82, 84 may project from the foam core 20 adjacent the first core face 22, and the second strip ends 86, 88, 90, 92 may project from the foam core 20 adjacent the second core face 24. The first strip ends 78, 80, 82, and 84 and the second strip ends 86, 88, 90, 92 may be folded over, as shown in FIG. 2, to place them closely adjacent the first core face 22 and the second core face 24. Additional strips may be inserted transversely through the one or more channels 30, 32 to overlap and layer on top of the reinforcing strips 70, 72, 74, 76. The same number of layered strips may be positioned adjacent each portion of the first core face 22 and the second core face 24 to form a relatively flat area for the at least one skin ply layer 100, 102, 104, 106 to bond to during molding. One or more additional supplemental strips 94, 96 may be inserted transversely through the channels 30, 32 so that the additional supplemental strips 94, 96 are positioned substantially completely within the channel 30, 32.

At step 128, the foam core 20 may be wrapped with at least one skin ply layer 100, 102, 104, 106 to form a preform hockey stick blade. The at least one skin ply layer 100, 102, 104, 106 may be wrapped continuously along the first core face 22, top core edge 26, second core face 24 and bottom core edge 28. If more than one skin ply layer is desired, the layers may be concentric wrappings (as illustrated in FIG. 2), or may be one continuous skin ply layer that forms multiple layers via spiral wrapping. Further optionally, the one or more skin ply layers 100, 102, 104, 106 may be formed from multiple separate sections that are positioned on one or more of the first core face 22, top core edge 26, second core face 24 and bottom core edge 28. During wrapping, the one or more skin ply layers 100, 102, 104, 106 may contact the first strip ends 78, 80, 82, 84 adjacent the first core face 22 and may contact the second strip ends 86, 88, 90, 92 adjacent the second core face 24.

At step 130, the preform is cured under suitable temperature and pressure, and at step 132 the cured blade is removed from the mold. The preform can optionally be cured according to fixed displacement thermal molding (FDTM) processes. During the curing process, the first strip ends 78, 80, 82, 84 may become joined with the at least one skin ply layer 100, 102, 104, 106 adjacent the first core face 22 and the second strip ends 86, 88, 90, 92 may become joined with the at least one skin ply layer 100, 102, 104, 106 adjacent the second core face 24. During molding, the portions of the reinforcing strips 70, 72, 74, 76 and the supplemental strips 94, 96 located within the channels 30, 32 may be compressed between the upper core portion 50, the middle core portion 54 and the lower core portion 52. During cure, the strips 70, 72, 74, 76 and supplemental strips 94, 96 may form a solid bridge between the first face 108 and second face 110 of the at least one skin ply layer 100, 102, 104, 106. The mold may then be cooled for de-molding.

The cured blade can optionally include a hollow hosel integrally formed with the blade. For example, a hosel preform can be bladder molded while the blade preform is within the mold. That is, an air bladder positioned within a hosel preform can create pressure to force the hosel preform against the mold until the hosel and the blade cure. The hosel can be attached to a shaft at step 134 and finished at step 136. In other embodiments, the preform can be integrated with a shaft layup and then subjected to a curing process to obtain a one-piece product. The finishing process can include structural aspects such as deburring, sanding or grinding any imperfections out from the mold finish and can include aesthetic aspects such as painting, decaling or polishing.

In another embodiment, the above method 120 includes resin transfer molding rather than compression molding. In this embodiment, the reinforcing strips 70, 72, 74, 76, the supplemental strips 94, 96 and the skin ply layers 100, 102, 104, 106 may be dry fabric materials and may not be pre-impregnated with an epoxy resin. As one of skill in the art will appreciate, resin transfer molding involves injecting the resin separately into a dry preform in a mold rather than including the resin as a preimpregnated material in the reinforcing strips and the skin ply layers.

Figure 6:
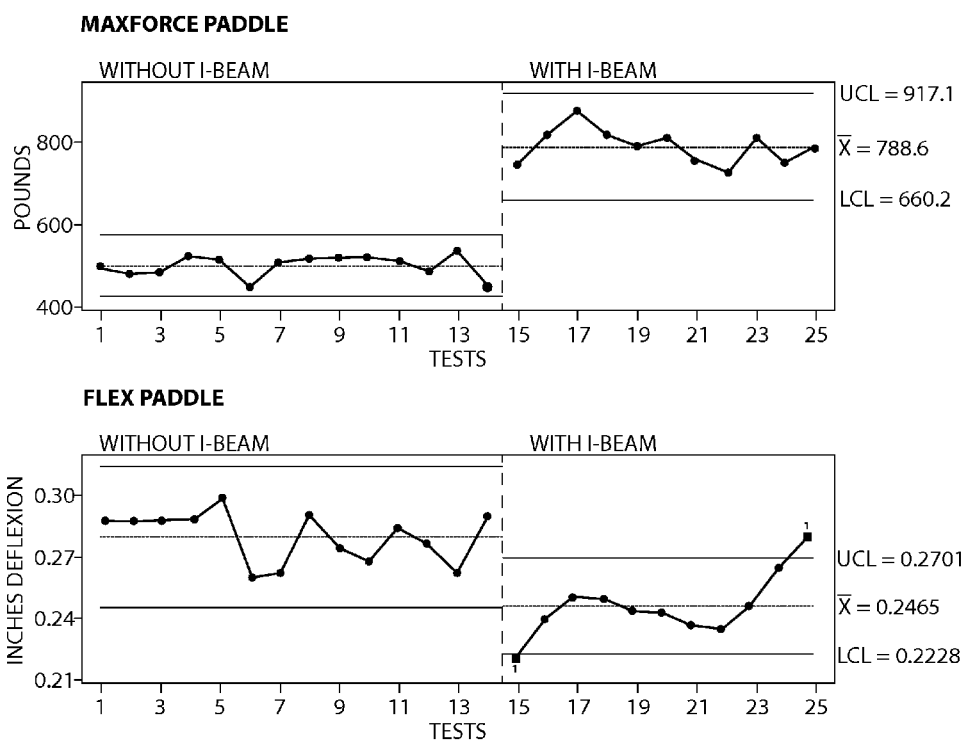
FIG. 6 includes graphs illustrating test data for a composite hockey stick blade formed according to the method of FIG. 5.

Multiple tests have been conducted on blades constructed in accordance with the method described above. As shown in FIG. 6, for example, hockey stick blades including a reinforced core element demonstrated an appreciable increase in blade strength. In particular, the maximum three-point breaking force improved to over 700 lbs of force, demonstrating an increase of 200 lbs to 300 lbs over blades lacking a reinforced core element. In addition, flexibility of the blade remained within desirable parameters, being between 0.2228 inches of flexion and 0.2701 inches of flexion.

IV. Additional Exemplary Embodiments

Figure 7:
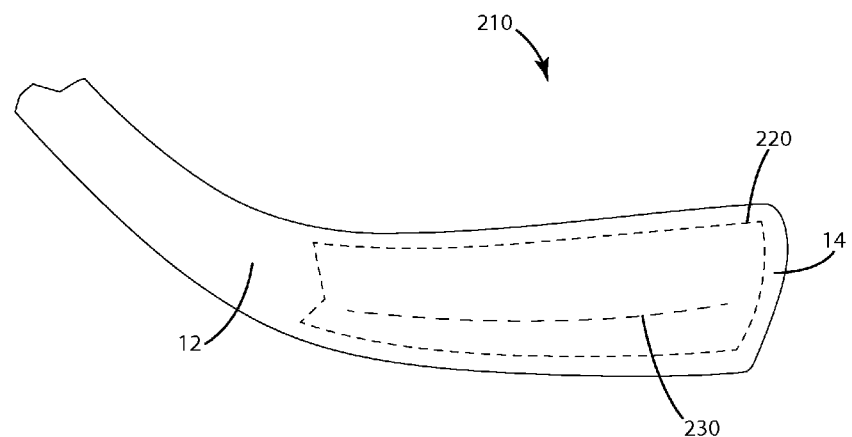
FIG. 7 is a front view of a composite hockey stick blade in accordance with another embodiment of invention.
Figure 8:
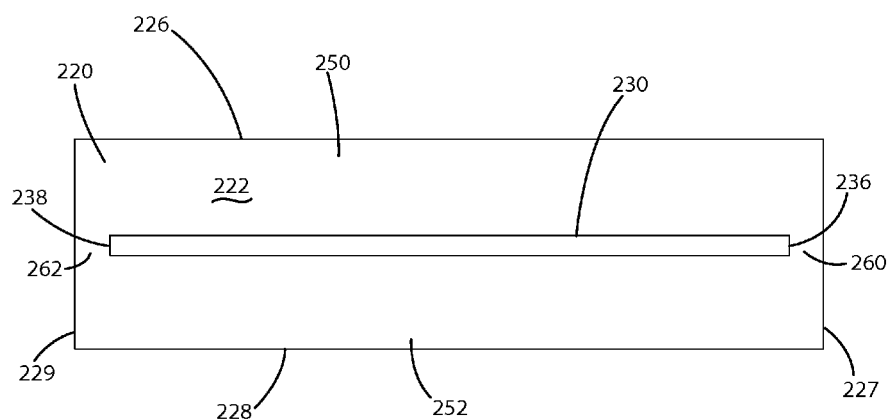
FIG. 8 is a front view of a core element of the composite hockey stick blade of FIG. 7.

Referring now to FIGS. 7-8, a hockey stick blade according to another embodiment is illustrated and generally designated 210. The hockey stick blade 210 is structurally and functionally similar to the hockey stick blade 10 discussed above. In this embodiment, however, the foam core 220 defines only a single channel 230. One or more reinforcing strips are received transversely through the channel 230 to reinforce the foam core 220 substantially as set forth above in connection with FIGS. 1-4. In addition, the foam core 220 includes a first core face 222, a second core face 224, a top core edge 226, a bottom core edge 228, a toe core edge 227 and a heel core edge 229. The channel 230 is defined in the foam core 220 at a location between the top core edge 226 and the bottom core edge 228, and between the toe core edge 227 and the heel core edge 229. The channel 230 includes a first channel end 236 proximate the toe region 14 and a second channel end 238 proximate the heel region 12.

As shown in FIG. 8, the upper core portion 250 and lower core portion 252 may be attached to and continuous with one another via a first foam core bridge member 260 and/or a second foam core bridge member 262. The bridge members 260, 262 and the remainder of the foam core 220 may form a unitary, one-piece, monolithic structure, with the bridge members 260, 262 closing the first end 236 and the second end 238 of the channel 230.

Figure 9:
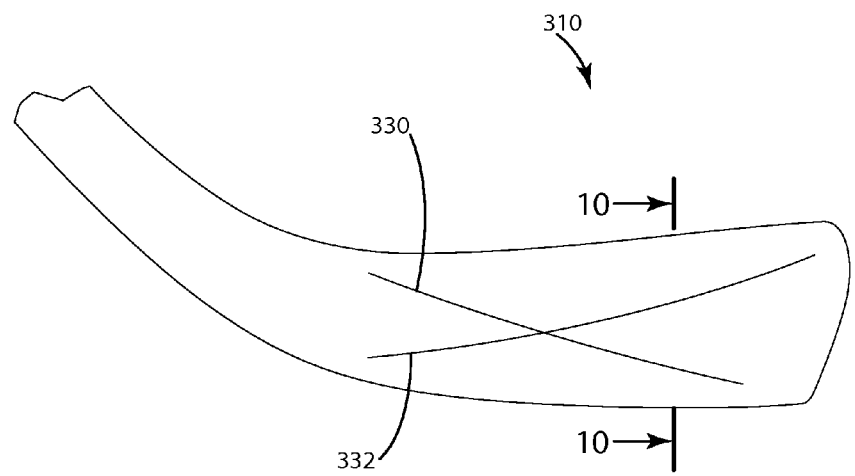
FIG. 9 is a front view of a composite hockey stick blade in accordance with another embodiment of invention.
Figure 10:
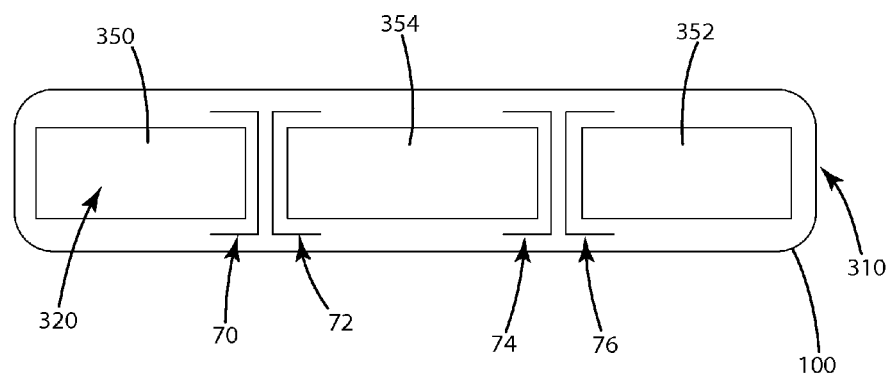
FIG. 10 is a sectional view taken along line 10-10 of FIG. 9.

Another embodiment is shown in FIGS. 9-10 and is generally designated 310. In this embodiment, the foam core 320 has two channels 330, 332 that are oriented in an "X" configuration when viewed from the side. As shown in FIG. 10, the foam core 320 may include an upper core portion 350, a lower core portion 352 and two middle core portions 354 (one on a first side of the crossing point of the "X" and a second on the other side of the crossing point of the "X"). As with the above embodiments, the reinforcing strips 70, 72, 74, 76 may span the entire length of channels 330, 332. Optionally, the reinforcing strips 70, 72, 74, 76 may span a length less than the length of channels 330, 332. For example, the reinforcing strips 70, 72, 74, 76 may span each side of the channels 330, 332 up to the crossing point of the "X" configuration. If the reinforcing strips 70, 72, 74, 76 span the entire length of the channels 330, 332, a partial slit or other suitable configuration may be formed in the reinforcing strips 70, 72, 74, 76 at the crossing point of the "X" configuration to accommodate the crossing of the reinforcing strips 70, 72, 74, 76. Optionally, there may be multiple channels and reinforcing strips criss-crossing one another at the same or different angles if desired for a particular application.

Figure 11:
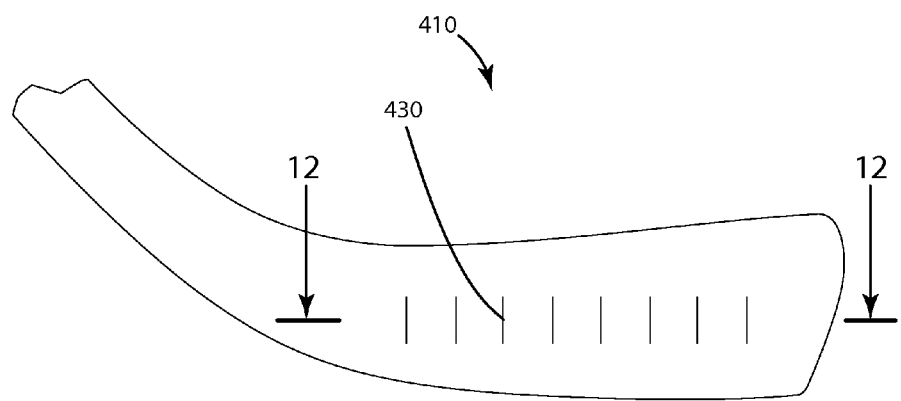
FIG. 11 is a front view of a composite hockey stick blade in accordance with another embodiment of invention.
Figure 12:
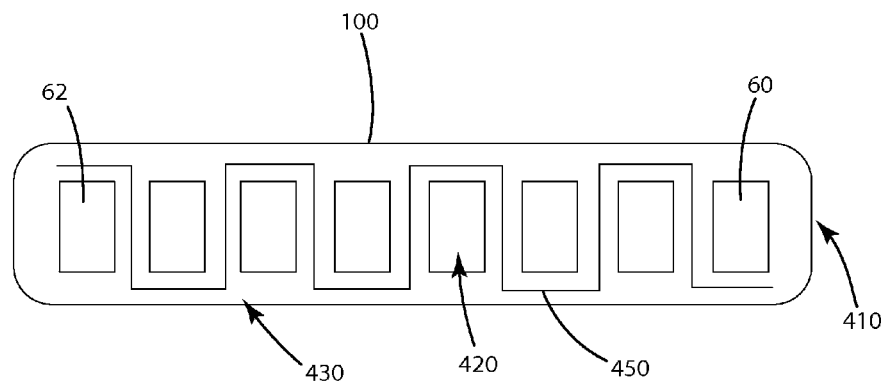
FIG. 12 is a sectional view taken along line 12-12 of FIG. 11.

Another embodiment of a hockey stick blade including a reinforced foam core is shown in FIGS. 11-12 and generally designated 410. As shown in FIG. 11, the foam core 420 includes multiple small channels or slits 430 extending from the first core face 22 to the second core face 24. As shown in the sectional view of FIG. 12, one or more strings 450 having material preimpregnated with an epoxy resin may be routed through the channels 430 in alternate directions in a zig-zag configuration. The material may be any suitable material, including those listed above. Optionally, more strings 450 may be routed through the foam in the same zig-zag configuration as the first string 450. Further optionally, one or more strings 450 may be added such that at least two strings 450 are oriented in a criss-cross configuration. In a criss-cross configuration, the at least two strings would form multiple figure "8" shapes between the two bridge members 60, 62. In a further optional configuration, a small gap may be maintained between the at least one string 450 and the at least one skin ply layer 100, 102, 104, 106 so that the at least one skin ply layer 100, 102, 104, 106 may not directly bond with the strings 450. Optionally, the small gap may be maintained so that the at least one skin ply layer 100, 102, 104, 106 may not directly bond with the edges of the strings 450. In an even further optional configuration, the one or more strings 450 may be routed entirely through the foam core 420 such that the one or more strings 450 never extend past the outer surfaces of the foam core 420. In this configuration, additional channels may be defined in the foam core 420 adjacent the first core face 22 and the second core face 24 so that the one or more strings 450 are routed within the foam core 420 to extend between adjacent channels 430, instead of being routed around the foam core 420 as illustrated in FIG. 12. In each of these embodiments, the number of channels 430, the size of the channels 430, the position of the channels 430, and the number of strings 450 may be altered to vary the characteristics of the blade.

Figure 13:
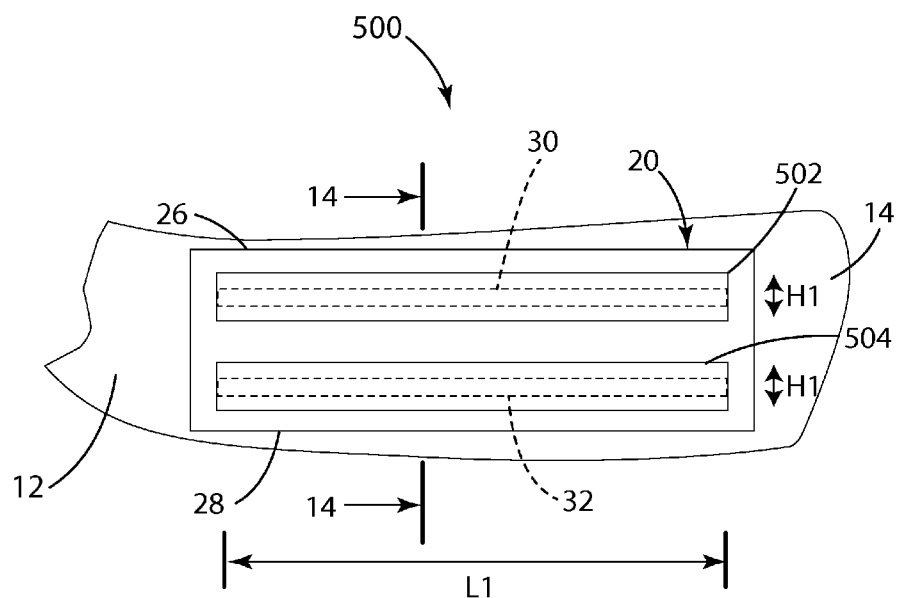
FIG. 13 is a front view of a composite hockey stick blade in accordance with another embodiment of the invention.
Figure 14:
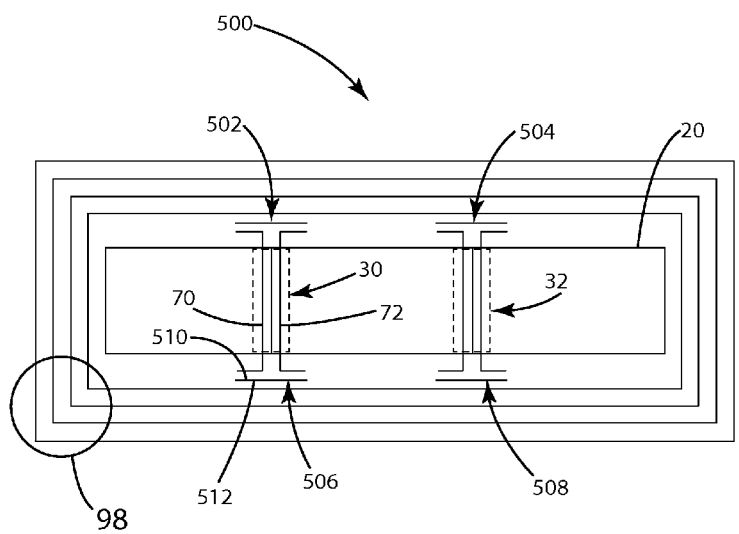
FIG. 14 is a sectional view taken along line 14-14 of FIG. 13.

In accordance with another embodiment, the hockey stick blade can include an adhesive film interposed between the reinforcing strips and the outer plies. Referring now to FIGS. 13-14, a hockey stick blade according to this embodiment is illustrated and generally designated 500. The hockey stick blade is structurally and functionally similar to the hockey stick blade of FIGS. 1-4, having a foam core 20 defining upper and lower channels 30, 32 for receipt of one or more reinforcing plies 70, 72, 74, 76 therein. The upper and lower channels 30, 32 extend longitudinally from the heel region 12 of the hockey stick blade 10 to the toe region 14 of the hockey stick blade 10, extending substantially parallel to the foam core upper edge 26 and lower edge 28.

As noted above, the hockey stick bade 10 additionally includes an adhesive film 502, 504, 506, 508 interposed between the reinforcing plies 70, 72, 74, 78 and the outer skin plies 100. As shown in FIG. 13, for example, an upper adhesive film 502 overlies the upper channel 30 and a lower adhesive film 504 overlies the lower channel 32. The adhesive film includes an inner surface 510 engaged with a reinforcing ply, and an outer surface 512 engaged with an outer skin ply. As shown in FIG. 14, for example, an adhesive film 506 includes an inner surface 510 opposite an outer surface 512. The inner surface 510 overlies and engages the reinforcing ply portions 70, 72 that fold over against the foam core 20. The outer surface 512 underlies and engages the innermost outer skin ply 100. The remaining adhesive films 502, 504, 508 likewise engage an underlying reinforcing strip and an outer skin ply 98.

As also shown in FIGS. 13-14, the upper adhesive films 502, 506 are optionally coextensive in length L1 with the upper channel 30, and the lower adhesive films 504, 506 are optionally coextensive in length L1 with the lower channel 32. While the lengths are shown as being substantially equal in the present embodiment, the lengths can differ in other embodiments. In addition, each adhesive film optionally includes a height H1 greater than or equal to the height of each channel 30, 32. For example, each adhesive film can include a height H1 between approximately 0.1 inches and 1.0 inch, further optionally between about 0.25 inches and 0.5 inches, extending over a channel having a height of between about 1/32 inches and 1/8 inches, further approximately 1/16 inches.

The adhesive film can be formed of any material to improve adhesion between the reinforcing strips 70, 72, 74, 86 and the skin plies 98. For example, the adhesive film 502 can include an epoxy film adhesive, optionally an epoxy film adhesive that is co-curable with the prepreg used in the blade lay-up. In one embodiment, the adhesive film includes NB102 available from Newport Adhesives and Composites, Inc., of Irvine, Calif. Other films can be used in other embodiments as desired. Functionally, the adhesive film increases the bonding between the reinforcing strips 70, 72, 74, 76 and the skin plies 98. In addition, the adhesive film increases the flow of resin into the respective channel 30, 32. Mechanical testing of a hockey stick blade formed according to the present embodiment revealed an appreciable increase in blade strength. For example, three-point break testing of a hockey stick blade included an internal adhesive layer demonstrated an increase of 100 lbs. in the maximum blade breaking force over hockey stick blades lacking an adhesive film layer.

In accordance with another embodiment, the hockey stick blade can include outer skin plies having a reduced modulus to thereby reduce the stiffness of the completed blade. A hockey stick blade according to this embodiment is structurally and functionally similar to the hockey stick blade of FIGS. 1-4, having a foam core 20 defining upper and lower channels 30, 32 for receipt of one or more reinforcing strips 70, 72, 74, 76 therein. In this embodiment, however, the outer skin plies 100, 102, 104, 106 are formed from a unidirectional tape having a lower modulus. A lower modulus tape can include, for example, T700 unidirectional graphite tape available from Toray Industries of Tokyo, Japan. Other tapes can be used in other embodiments as desired.

Lower modulus outer plies can generally have a higher toughness than higher modulus outer plies, while also being generally less expensive than higher modulus outer plies. The substitution of a lower modulus ply can also offset an increase in blade stiffness attributed to the internal reinforcing strips 70, 72, 74, 76. For example, a hockey stick blade formed according to the method of FIG. 5 can include an increase in weight of about 3-4 grams, while also adding 150 lbs. of maximum breaking force and between about 0.010 and about 0.020 of stiffness to the blade. When the method of FIG. 5 is modified to include a lower modulus unidirectional tape, the resulting hockey stick blade can achieve the same beneficial blade flex with an increase in strength and toughness and a decrease in material and production costs.

Figure 15:
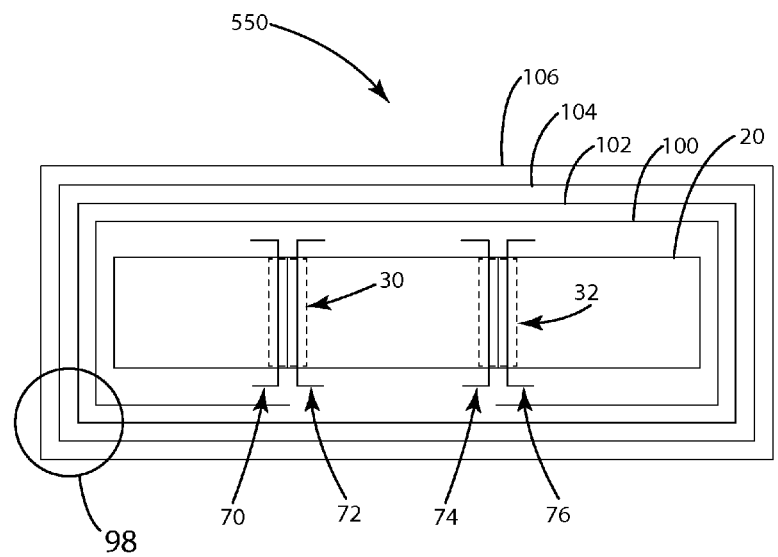
FIG. 15 is a section view of a composite hockey stick blade in accordance with another embodiment of the invention illustrating a removed skin ply.

In accordance with another embodiment, the hockey stick blade can include a fewer number of outer plies to offset any increase in stiffness attributed to the internal reinforcing strips. Referring now to FIG. 15, a hockey stick blade according to this embodiment is illustrated and generally designated 550. The hockey stick blade 550 is structurally and functionally similar to the hockey stick blade 10 of FIGS. 1-4, having a foam core 20 defining upper and lower channels 30, 32 for receipt of one or more reinforcing strips 70, 72, 74, 76 therein. However, in this embodiment the lay-up includes a fewer number of outer plies, optionally on one side of the lay-up, further optionally on the back side of the lay-up.

For example, the hockey stick blade 550 can include a lay-up beginning with the foam core 20 and the reinforcing elements 70, 72, 74, 76 substantially as described above in connection with FIGS. 1-4. The lay-up can additionally include multiple outer skin plies 98 encapsulating the foam core 20 and the reinforcing strips 70, 72, 74, 76. The outer skin plies 98 can include, for example, woven or unidirectional graphite fiber prepreg, fiberglass fiber prepreg, aramid fiber prepreg, blend fiber prepreg, as well as any of the above plies not yet impregnated with a resin. In the present embodiment, the outer skin plies 98 including multiple plies of unidirectional graphite prepreg 100, 102, 104 and an outer skin ply of woven graphite prepreg 106. When modified in accordance with the present embodiment, at least a portion of at least one outer skin ply 98 is omitted in the lay-up of the hockey blade preform. As a result, the outer skin 98 can be generally thicker (having a greater number of plies) at one portion thereof than at another portion thereof. In the present embodiment, the rear facing portion of the hockey stick blade 550 can have a fewer number of plies when compared to the forward facing portion of the hockey stick blade 500. In other embodiments, however, the forward facing portion of the hockey stick blade 550 can have a fewer number of plies when compared to the rearward facing portion of the hockey stick blade 550. The resulting blade 550 can therefore be manufactured at a lower material cost, while also achieving weight savings.

Figure 16:
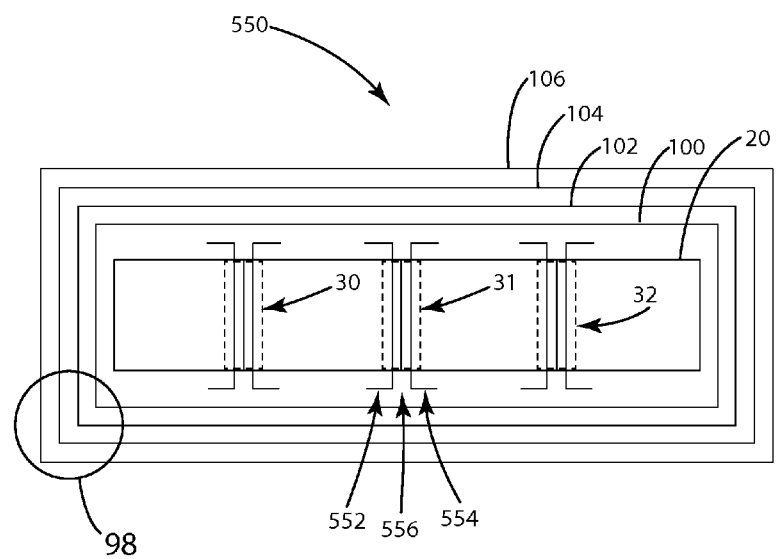
FIG. 16 is a section view of a composite hockey stick blade in accordance with another embodiment of the invention illustrating an additional channel.

Further in accordance with this embodiment, the lay-up can be modified to include additional channels and reinforcing plies therein. With reference to FIG. 16, the hockey stick blade 550 includes an added channel 31 approximately midway between the upper and lower channels 30, 32. The added channel 31 includes reinforcing strips 552, 554, 556 substantially as set forth above in connection with FIG. 2. In this embodiment, the additional reinforced channel 31 can add between about 3 grams and about 4 grams to the blade, while achieving an increase of about 150 lbs. in the maximum breaking force. The outer plies of unidirectional tape 98, by comparison, add about 5 grams, contributing to an increase of about 50 lbs. in the maximum breaking force. By modifying the lay-up of FIG. 2 to include an additional channel 31 and a reduced number of outer plies 98 in accordance with the present embodiment, the resulting blade can achieve a desired blade strength, without excessive stiffness or weight. For example, the addition of a reinforced channel 31 and the reduction of an outer ply can achieve a net increase of about 100 lbs. in the maximum breaking force and a net decrease of between 1 and 2 grams in the weight of the finished blade. Also by example, the addition of a reinforced channel 31 and the reduction of two outer plies can achieve a net increase of about 50 lbs. in the maximum breaking force and a net decrease of about 6 to 7 grams in the weight of the finished blade. Other combinations are also possible, including the further addition of a reinforced and/or the reduction in the outer plies and/or a change in the modulus of the outer plies.

As noted above, the reinforcing strips 70, 72, 74, 76, 94, 96, 552, 554, 556 can be formed of a wide variety of materials to strengthen the hockey stick blade. Exemplary materials can include, for example, woven or unidirectional graphite fiber prepreg, fiberglass fiber prepreg, blend fiber prepreg, as well as any of the above plies not yet impregnated with an epoxy resin. As a further embodiment of the present invention, the reinforcing strips can include aramid to further limit crack propagation from the lower blade edge 18 upwardly into the middle core portion 54. For example, at least one of the reinforcing strips 70, 72, 74, 76, 94, 96, 552, 554, 556 can include aramid fiber-reinforced unidirectional tape, optionally being pre-impregnated with a suitable epoxy resin. Also by example, the at least one reinforcing strip includes the lower-most reinforcing strip 76 subjacent the lower channel 32. The at least one reinforcing strip 76 can act as a barrier to crack propagation when a crack is formed in the lower blade edge 18. In particular, cracks that develop in the foam core 20 are generally initially confined to the lower core portion 52 by the reinforcing strip 76. Other reinforcing strips can additionally include aramid fibers including, for example, all or a subset of the reinforcing strips depicted in FIGS. 2, 10, 12, 14-16.

Figure 17:
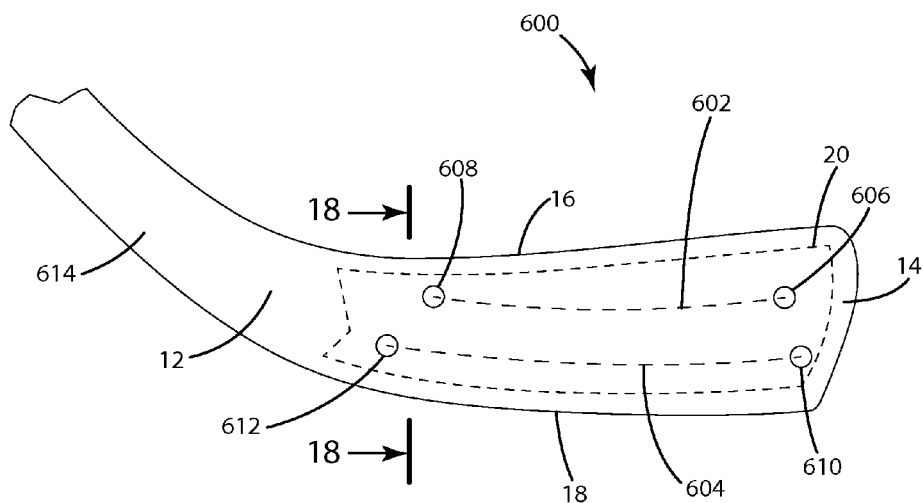
FIG. 17 is a front view of a composite hockey stick blade in accordance with another embodiment of the invention.
Figure 18:
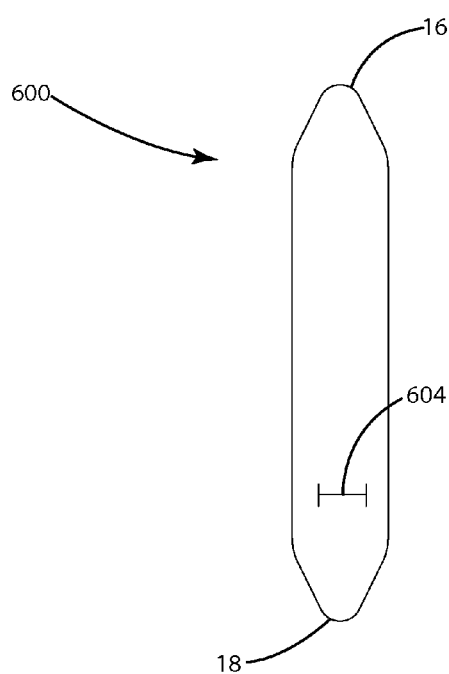
FIG. 18 is a sectional view taken along line 18-18 of FIG. 17.

In accordance with another embodiment, the hockey stick blade can include staggered or offset upper and lower reinforced channels. Alternatively, the channels can be of different lengths. Referring now to FIGS. 17-18, a hockey stick blade according to this embodiment is illustrated and generally designated 600. The hockey stick blade 600 is structurally and functionally similar to the hockey stick blade 10 of FIGS. 1-4, having a foam core 20 defining upper and lower channels 602, 604 for receipt of one or more reinforcing strips therein. The upper and lower channels 602, 604 originate in the toe region 14, extending rearwardly toward the heel region 12. However, in this embodiment the lower channel 604 continues into the heel region 12, while the upper channel 602 does not continue into the heel region 12, and instead terminates forward of the heel region 12. In accordance with the present embodiment, the lower channel 32 can reduce stress concentrations in the heel region, smoothing the transition from the blade 10 to the shaft 614.

As depicted in FIG. 17, the upper reinforced channel 602 includes a first end portion 606 and a second end portion 608. The lower reinforced channel 604 also includes a first end portion 610 and a second end portion 612. The first end portions 606, 610 are located in the toe portion 14 of the hockey stick blade 600. The lower second end portion 612 is offset rearwardly of the upper second end portion 608, toward the heel region 12, improving the heel edge impact resistance of the hockey stick blade 600. In the cross-sectional view of FIG. 18, the lower reinforced channel 604 is visible, while the upper reinforced channel 602 terminates forwardly of line 18-18 and is therefore not visible in FIG. 18. In other embodiments, however, the upper reinforced channel 602 extends further rearwardly than the lower reinforced channel 604, optionally into the heel region 12.

Optionally, the lower reinforced channel 604 defines a length greater than the length of the upper reinforced channel 602. Further optionally, the upper reinforced channel 602 defines a length greater than the length of the lower reinforced channel 604. In still other embodiments, the upper and lower reinforced channels 602, 604 are substantially equal in length and originate and terminate offset from each other. That is, the upper and/or lower reinforced channels 602, 604 originate longitudinally offset from each other, while also terminating longitudinally offset from each other. Other offset configurations can be used in other embodiments as desired.

Figure 19:
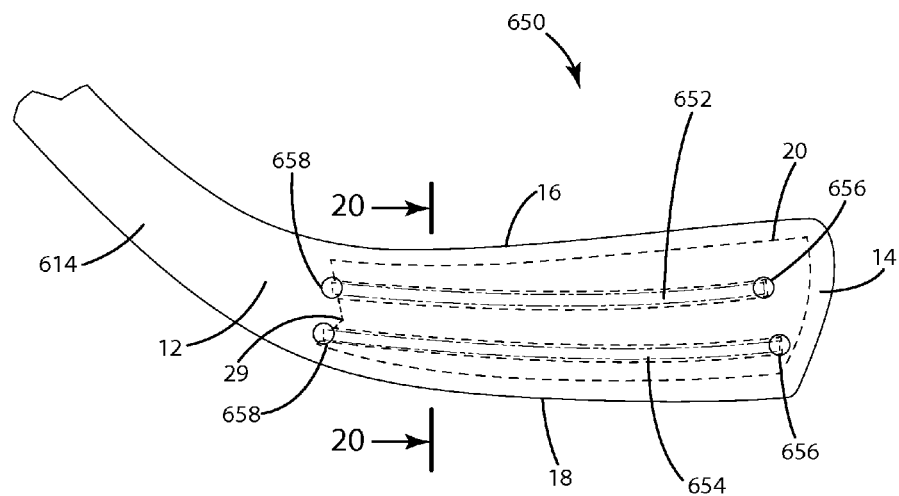
FIG. 19 is a front view of a composite hockey stick blade in accordance with another embodiment of the invention.
Figure 20:
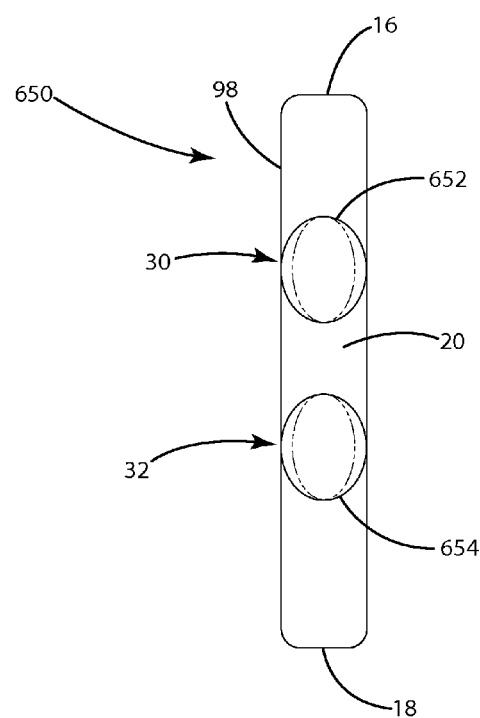
FIG. 20 is a sectional view taken along line 20-20 of FIG. 19.

In accordance with a further embodiment, the hockey stick blade can include one or more tubular elements. Referring now to FIG. 19-20, a hockey stick blade according to this embodiment is illustrated and generally designated 650. The hockey stick blade 650 is structurally and functionally similar to the hockey stick blade 10 of FIGS. 1-4, including a foam core 20 defining upper and lower channels 30, 32, also referred to herein as voids or cavities. However, in this embodiment upper and lower tubular elements 652, 654 are received within and generally positioned in the upper and lower channels 30, 32 respectively, extending longitudinally from the toe region 14 toward the heel region 12 of the hockey stick blade 650.

Referring now to FIG. 19, each of the upper and lower tubular elements 652, 654 are generally spaced apart from each other within the blade interior. The upper and lower tubular elements 652, 654 are longitudinal, extending from a first (toe) end portion 656 to a second (heel) end portion 658. As shown in FIG. 20, the upper and lower tubular elements 652, 654 define a generally circular cross-section. In other embodiments, however, the upper and lower tubular elements 652, 654 can be beam-like, defining a generally rectangular or polygonal cross-section. Other suitable cross-sectional geometries, such as I-beam shaped, elliptical, triangular, or others, can be used as desired.

The upper and lower tubular elements 652, 654 can define a cross-sectional area that remains constant along their length or that varies along their length. For example, the upper and lower tubular elements 652, 654 can define an outer diameter that increases as the tubular elements 652, 654 extend rearwardly from the toe region 14 toward the heel region 12. This increase can be continuous in some embodiments, optionally in proportion to the change in thickness of the hockey stick blade 650. In other embodiments this increase can be stepwise. Further by example, the upper and lower tubular elements 652, 654 can define an outer diameter that remains substantially constant as the tubular elements 652, 654 extend rearwardly from the toe region 14 to the heel region 12. In these embodiments, the outer diameter of the tubular elements 652, 654 is generally less than the width of the foam core 20, such that the tubular elements 652, 654 do not protrude laterally outwardly of the foam core 20, being optionally entirely laterally encapsulated within the foam core 20. In addition, the upper tubular element 652 can be slightly shorter than the lower tubular element 654 in some embodiments, attributable to the concave bend in the upper edge 16 of the hockey stick blade 650. In other embodiments, the upper tubular element 652 can be slightly longer than the lower tubular element 654, however.

The upper and lower tubular elements 652, 654 can be formed of any material adapted to reinforce the upper and lower channels 30, 32, respectively. In one embodiment, the upper and lower tubular elements are formed from a deformable thermoplastic material including, for example, nylon, polyvinyl chloride (PVC), polyethylene (PE), and acrylonitrile butadiene styrene (ABS). In another embodiment, the upper and lower tubular elements are formed from a metal alloy including, for example, 6061 aluminum alloy, a steel allow, a titanium allow or other metal alloys. In addition, the tubular elements 702, 704 are substantially hollow in the present embodiment, having an air core to decrease the overall weight of the hockey stick blade 700. In other embodiments the tubular elements 702, 704 can include a core material, including a foam core material or an expanding film core material for example.

As depicted in FIG. 19, the upper and lower channels 30, 32 open to the exterior of the foam core 20 at the heel core edge 29. During assembly of the blade lay-up, the tubular elements 652, 654 are inserted into the upper and lower channels 30, 32 formed in the foam core 20. During molding, the tubular elements 652, 654 can change shape and/or thickness to accommodate the final shape of the hockey stick blade 650. For example, the tubular elements can be of a circular cross-section when placed in the mold. During molding, the front to back dimension of the tubular elements 652, 654 can be reduced under the pressure and forces of the mold. In turn, the tube is deformed, optionally from a circular cross-section to an elliptical cross section.

The tubular elements 652, 654 provide strength, stiffness and toughness to the foam core 20, reinforcing the cured blade 650 substantially as set forth above in connection with FIGS. 1-18. The hockey stick blade 650 can optionally include an adherent interposed between the tubular elements 652, 654 and the foam core 20. The adherent can include, for example, a film adhesive, optionally an epoxy film adhesive that is co-curable with the prepreg used in the blade lay-up. In one embodiment, the adherent includes NB102 available from Newport Adhesives and Composites, Inc., of Irvine, Calif. Other adhesives can be used in other embodiments as desired.

To reiterate, the tubular elements 652, 654 can be hollow and can extend longitudinally from the toe portion 14 to the heel portion 12 of the blade 650. However, the tubular elements 652, 654 can also extend vertically between the tope edge of the blade 16 to the bottom edge of the blade 18, or in various other orientations. The tubular elements 652, 654 can be constructed from a ductile and deformable material, and of a thickness that permits the tubular elements 652, 654 to deform when molded. Generally, the tubular elements 652, 654 are capable of being deformed from a first cross-sectional shape to a second cross-sectional shape under mold pressure. That is, during compression within the mold cavity, at least a portion of the tubular elements 652, 654 can deform. For example, the tubular elements 652, 654 can bend, buckle, or crush slightly to take on a second cross-sectional shape (shown in phantom in FIG. 20) different from a first cross-sectional shape (shown in solid in FIG. 20). While in the mold, heat can be applied to cure the blade preform. The mold cavity can be heated to greater than 250° F. in some embodiments, optionally between about 250° F. and about 500° F. During this curing process, the tubular elements 652, 654 can soften, becoming more readily deformable within the foam core 20.

After the blade preform is cured, the cured blade is removed from the mold cavity, and the tubular elements 652, 654 remain in their deformed state. The tubular elements 652, 654 can provide additional strength, rigidity, stiffness and/or toughness to the cured blade 650. Further, if the exterior skin layer begins to crack under extreme loads, the blade can maintain its integrity without brittle failure, at least partially due to the tubular elements 652, 654. It should be noted that in some constructions the blade will taper in width from the toe to the heel. Thus, in some cases, only a portion of the tubular elements 652, 654 will deform. For example, toward the toe of the blade where the blade is usually "thin," the tubular elements 652, 654 can deform more into a flattened elliptical form. In contrast, toward the heel of the blade, where the width is usually "thick," the tubular elements 652, 654 can maintain a generally circular or original geometric shape.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to packages of any specific orientation(s). Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, and any combination of X, Y and Z, for example, X, Y, Z; X, Y; X, Z; and Y, Z.

The Invention claimed is:

1. A composite hockey stick blade including a heel portion and a toe portion, the composite hockey stick blade comprising:
    a core element including a first core face opposite a second core face, the core element defining a through-hole therebetween, the through-hole extending longitudinally along a portion of the core element to define a channel having a first channel end portion and a second channel end portion, the core element including an upper core portion above the channel and a lower core portion below the channel, the core element including a core bridge member extending from the upper core portion to the lower core portion so that the upper core portion, core bridge member and lower core portion are joined and contiguous with one another, forming a unitary, monolithic structure, with the core bridge member bounding the first channel end portion;
    a first fiber-reinforced strip disposed in the channel to increase the strength of the core element, the first fiber-reinforced strip extending longitudinally from the first channel end portion to the second channel end portion, the first fiber reinforced strip including a first strip end, a second strip end distal from the first strip end, and an intermediate portion therebetween, the intermediate portion extending transversely across the channel, the first strip end projecting out from the channel and positioned adjacent the first core face, the second strip end projecting out from the channel end positioned adjacent the the second core face; and
    a plurality of outer plies substantially encapsulating the core element and the first fiber-reinforced strip, at least one of the plurality of outer plies engaging at least one of the first strip end and the second strip end, wherein the channel and the first fiber-reinforced strip extend along a substantial portion of the blade length between the heel portion and the toe portion.

2. The composite hockey stick blade of claim 1 wherein the first strip end, intermediate portion and second strip end cooperatively form a C-shape.

3. The composite hockey stick blade of claim 2 comprising a second fiber reinforced strip disposed transversely through the channel, adjacent the intermediate portion.

4. The composite hockey stick blade of claim 3 wherein the second fiber reinforced strip includes a third strip end and a fourth strip end, the third strip end engaging the first core face, the fourth strip end engaging the second core face.

5. The composite hockey stick blade of claim 3 wherein the second fiber reinforced strip contacts the first core face the second core face.

6. The composite hockey stick blade of claim 5 wherein the second fiber reinforced strip is generally of a C-shape.

7. The composite hockey stick blade of claim 5 comprising a third fiber reinforced strip extending transversely through the channel, between the first fiber reinforced strip and the second fiber reinforced strip.

8. The composite hockey stick blade of claim 1 wherein the first reinforcing strip includes a plurality of fiber-reinforced plies.

9. The composite hockey stick blade of claim 8 wherein the plurality of fiber-reinforced plies include at least one of graphite, carbon, aramid, and fiberglass.

10. The composite hockey stick blade of claim 1 wherein the channel is a first channel, the core element further defining a second channel therein, below the lower core portion the second channel being substantially parallel to and vertically spaced apart from the first channel.

11. The composite hockey stick blade of claim 1 wherein the core element is a unitary structural foam core.

12. A composite hockey stick blade including a heel portion and a toe portion, the composite hockey stick blade comprising:
    a core element including a first core face opposite a second core face and defining a through-hole therebetween, the through-hole extending longitudinally along a portion of the core element to define a channel having first and second end portions;
    a fiber-reinforced material received within the channel to increase the strength of the core element, the fiber-reinforced material extending longitudinally from the first end portion to the second end portion, and extending transversely across the channel, the fiber-reinforced material engaging the first core face and the second core face; and
    a plurality of outer plies substantially encapsulating the core element and the fiber-reinforced material, wherein the longitudinal channel and the fiber-reinforced material extend along a substantial portion of the blade length between the heel portion and the toe portion,
    wherein the channel is bounded by an upper core portion and a lower core portion, with a first core bridge member and a second core bridge member joining the upper and lower core portions at the channel first and second end portions to form a unitary, one piece structural foam core,
    wherein the fiber-reinforced material includes a first strip end distal from a second strip end with an intermediate portion therebetween,
    wherein the first strip end is adjacent the first core face, and terminates adjacent the channel,
    wherein the second strip end is adjacent the second face and terminates adjacent the channel.

13. The composite hockey stick blade of claim 1 wherein the first strip end, intermediate portion and second strip end cooperatively form a C-shape.

14. The composite hockey stick blade of claim 13 wherein the second core bridge member is distal from the first core portion,
    wherein the first core bridge member is in the heel of the blade,
    wherein the second core bridge member is in the toe of the blade.

* * * * *